No. 12,566. REISSUED NOV. 20, 1906.

R. P. WINSOR.

SHOCK ABSORBER FOR VEHICLES.

APPLICATION FILED MAY 8, 1906.

*Witnesses:*

Geo. E. Gault

A. M. Stofford

*Inventor:*

Robert P. Winsor by his attorney

A. L. Ewin.

UNITED STATES PATENT OFFICE.

ROBERT P. WINSOR, OF PROVIDENCE, RHODE ISLAND, ASSIGNOR TO WINSOR & JERAULD MANUFACTURING COMPANY, OF PROVIDENCE, RHODE ISLAND, A CORPORATION OF MAINE.

SHOCK-ABSORBER FOR VEHICLES.

No. 12,566. Specification of Reissued Letters Patent. Reissued Nov. 20, 1906.

Original No. 818,646, dated April 24, 1906. Application for reissue filed May 8, 1906. Serial No. 315,848.

*To all whom it may concern:*

Be it known that I, ROBERT P. WINSOR, a citizen of the United States of America, and a resident of Providence, in the State of Rhode Island, have invented a new and useful Improvement in Shock-Absorbers for Spring-Vehicles, of which the following is a specification.

This invention relates to "shock-absorbers" for automobiles and other road-vehicles in which the body of the vehicle is supported by springs.

The present invention consists in certain novel combinations of parts hereinafter described and claimed; and its leading object is to prevent or reduce violent motion of the spring-supported body in both directions on rough roads, so as to prevent the breaking of the springs, the straining of the vehicle, and the shaking up of the passengers by sudden shocks, and at the same time to avoid continuously intensifying or stiffening the springs, so as to render the vehicle easy riding on smooth roads.

Other objects of the present invention are to adapt each of the shock-absorbers to be readily adjusted, so as to offer the necessary degree of frictional resistance to the "thrashing" of the springs on rough roads, to adapt the same to be adjusted so as to increase or reduce the scope of free movement for smooth roads, and to cushion the contact of the opposing surfaces of the lost-motion device.

A sheet of drawings accompanies this specification as part thereof.

Figure 1:
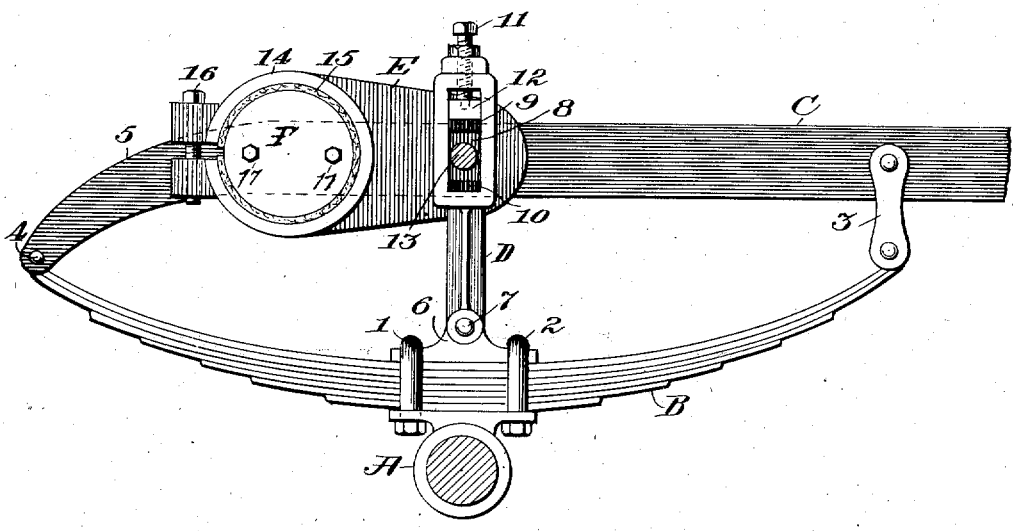
Figure 2:
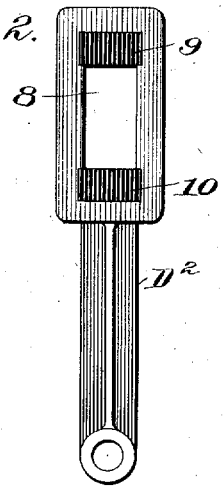

Figure 1 is a side view of one of the improved shock-absorbers attached to a spring-vehicle, and Fig. 2 is an elevation of a substitute slotted connection detached.

Like reference characters refer to like parts in both figures.

It will be understood that each vehicle is provided with one or more of the shock-absorbers, usually one at each body-supporting spring.

In Fig. 1 the axle A is crossed by a semi-elliptic body-supporting spring B, which is attached to the axle by a pair of clips 1 and 2 and is connected with the body-frame C by a link 3 at the front end of the spring and a hinge-joint 4 at the extremity of a rigid extension 5 of the frame C. The cap 6 of the clips 1 and 2 is adapted for the attachment thereto directly above the axle by a pivotal bolt 7 of the lower end of a slotted connection D or $D^2$ in the form of a short pitman, the upper end of which is provided with a vertical slot 8, with cushions 9 and 10 at its respective ends, and with or without an adjusting-screw 11 and follower 12 for increasing or reducing the scope of free movement for smooth roads. (Compare Figs. 1 and 2.) Said slot 8 and cushions 9 and 10 interact with a stud 13, which projects rigidly from the side of a lever-piece E near its inner end and normally occupies a position midway between the cushions 9 and 10, as in Fig. 1, with sufficient space between to prevent contact at the extremes of such upward and downward movements of the spring-supported body as occur when riding on fairly smooth roads. When such smooth-road movement is exceeded, said slotted connection D or $D^2$ and lever-piece E interact to move the latter on its axis of movement, and such excessive movement is resisted and reduced by a strap 14, forming part of said lever-piece E and provided with a frictional lining 15, of leather or the like, which embraces the periphery of a relatively stationary circular drum F.

The frictional contact of the strap 14 with the drum F is regulated by a screw-bolt 16, uniting the ends of the strap and easily accessible at the end of the vehicle, while the slotted connection D or $D^2$ renders the lever-piece E movable by hand when the vehicle is at rest. By so moving said lever-piece the resistance of the frictional device can be determined with nicety, and by means of said bolt 16 the same may be regulated as required.

The drum F may be rigidly attached to the frame C by bolts 17 or in any approved manner.

The cushions 9 and 10 may be rubber springs, as represented, or springs or cushions of other known or improved forms, or they may in some cases be omitted, and other like modifications will suggest themselves to those skilled in the art.

Having thus described said improvement, I claim as my invention and desire to patent under this specification—

1. The combination, with an axle, body-frame, and body-supporting springs, in a road-vehicle, of a shock-absorber interposed between the axle and body-frame and comprising a frictional device by which the springs are stiffened and their movements retarded on rough roads, said frictional device comprising a member fixedly attached to said body-frame and a relatively movable member and a slotted connection between said relatively movable member and the axle for rendering said frictional device idle on smooth roads.

2. The combination, with an axle, body-frame, and body-supporting springs, in a road-vehicle, of a shock-absorber interposed between the axle and body-frame and comprising a circular drum fixedly attached to said body-frame, a lever-piece including a strap having a lining of leather or the like embracing the periphery of said drum and provided with a stud, a slotted connection, the slot of which embraces said stud, and means for adjusting said strap, to increase or reduce the frictional resistance, said lever-piece being movable by hand when the parts are at rest.

3. The combination, with an axle, body-frame, and body-supporting springs, in a road-vehicle, of a shock-absorber interposed between the axle and body-frame and comprising a circular drum fixedly attached to said body-frame, a lever-piece including a strap having a lining of leather or the like embracing the periphery of said drum and provided with a stud, a slotted connection, the slot of which embraces said stud, and means for adjusting said slotted connection to vary the effective length of the slot.

4. The combination, with an axle, body-frame and body-supporting springs, in a road-vehicle, of a shock-absorber interposed between the axle and body-frame and comprising a circular drum fixedly attached to said body-frame, a lever-piece including a strap having a lining of leather or the like embracing the periphery of said drum and provided with a stud, a slotted connection, the slot of which embraces said stud, and means within said slot for cushioning the contact of its ends with said stud, substantially as hereinbefore specified.

5. The combination, with an axle, body-frame, and body-supporting springs, in a road-vehicle, of a shock-absorber interposed between the axle and the body-frame and comprising a frictional device by which the springs are stiffened and their movements retarded on rough roads, said frictional device comprising a fixedly-attached circular drum, a lever-piece including a strap having a lining of leather or the like embracing the periphery of said drum, and a pivotally-attached lost-motion connection for rendering said frictional device idle on smooth roads, substantially as hereinbefore specified.

6. The combination, with an axle, body-frame, and body-supporting springs, in a road-vehicle, of a shock-absorber interposed between the axle and body-frame and comprising a frictional device by which the springs are stiffened and their movements retarded on rough roads, said frictional device comprising a member fixedly attached to said body-frame and a relatively movable member, and a lost-motion connection between said relatively movable member and the axle, for rendering said frictional device idle on smooth roads, substantially as hereinbefore specified.

ROBERT P. WINSOR.

Witnesses:
FRANK L. JERAULD,
AMY B. SUTCLIFFE.